United States Patent [19]

O'Donnell et al.

[11] Patent Number: 4,520,074
[45] Date of Patent: May 28, 1985

[54] POLYMERIZABLE 3-AROYLOXYPHENYL CARBAMATES AND METHODS FOR THEIR PREPARATION AND USE

[75] Inventors: Timothy W. O'Donnell; Daniel R. Olson, both of Schenectady, N.Y.

[73] Assignee: General Electric Company, Schenectady, N.Y.

[21] Appl. No.: 632,732

[22] Filed: Jul. 20, 1984

[51] Int. Cl.³ .................... B32B 27/36; C07C 69/76
[52] U.S. Cl. ........................... 428/412; 560/100; 560/205; 560/109; 526/310; 428/500; 428/451
[58] Field of Search ................ 560/100, 8, 205; 526/310, 109; 428/412, 500

[56] References Cited

U.S. PATENT DOCUMENTS

| 3,891,523 | 6/1975 | Hisamatsu et al. ........... 526/301 |
| 4,082,894 | 4/1978 | Yoshida ........................ 428/412 |
| 4,278,809 | 7/1981 | Burdett ......................... 560/222 |
| 4,447,493 | 5/1984 | Driscoll et al. ............... 428/412 |

OTHER PUBLICATIONS

Chem. Abstracts, vol. 95, Entry 43617k, Nitz et al.
Chem. Abstracts, vol. 91, Entry 39918j, Nakamura et al.

Primary Examiner—Paul R. Michl
Assistant Examiner—Peter F. Kulkosky
Attorney, Agent, or Firm—William H. Pittman; James C. Davis, Jr.; James Magee, Jr.

[57] ABSTRACT

Novel polymerizable 3-aroyloxyphenyl carbamates such as 3-benzoyloxyphenyl 2-methacryloxyethylcarbamate form addition polymers which are useful as surface coatings for resinous (especially polycarbonate) articles. The coatings protect the resinous articles against discoloration as the result of ultraviolet radiation-induced degradation and also may serve as primers for abrasion-resistant coatings such as silicone hardcoats.

21 Claims, 1 Drawing Figure (I)

(II)

(III)

(IV)

(V)

(VI)

(VII)

(I) 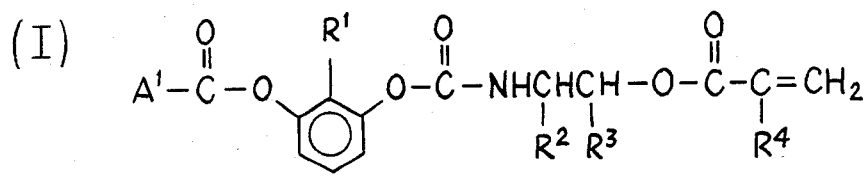
(II) 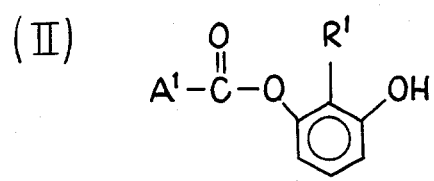
(III) 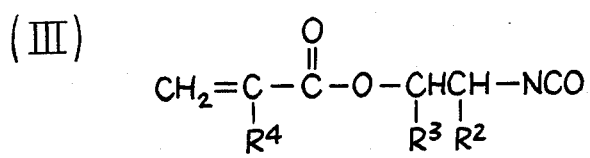
(IV) 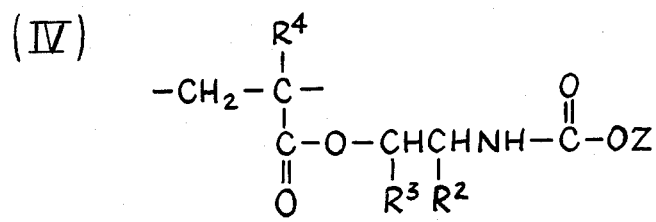
(V) 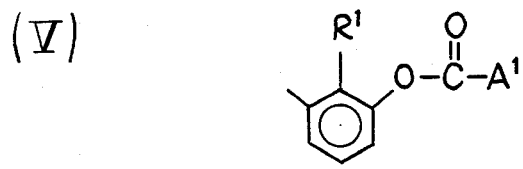
(VI) 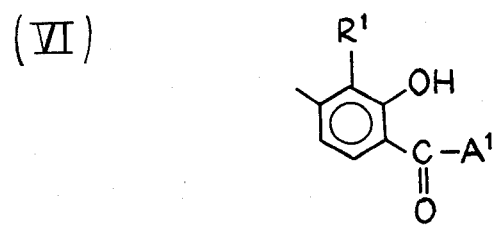
(VII) 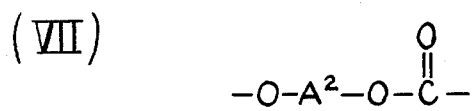

POLYMERIZABLE 3-AROYLOXYPHENYL CARBAMATES AND METHODS FOR THEIR PREPARATION AND USE

This invention relates to new monomeric compositions of matter, polymers thereof, and articles of manufacture comprising said polymers. In a more particular sense, it relates to improved resinous articles containing coatings which provide a number of beneficial properties including resistance to light-induced degradation.

Various industrial resins are in wide use for molding of structural articles and also, in transparent sheet form, as shatterproof substitutes for glass. Aromatic polycarbonates are examples of such industrial resins. There are certain problems with their use, however. One such problem is discoloration during use as the result of ultraviolet radiation-induced degradation.

Ultraviolet degradation is frequently prevented by coating the surface of the resinous article with a composition, usually polymeric, containing an absorber of such radiation. Typical absorbers are compounds containing a hydroxybenzophenone moiety. The absorber may be dispersed in the coating composition prior to or during its deposition on the resin article, but a disadvantage of this procedure is that the absorber may be lost by volatilization or otherwise during processing of the article. This is particularly true when the article is in sheet form and must be subjected to molding or extrusion operations. It is often advantageous, therefore, to incorporate the hydroxybenzophenone derivative as an integral part of the polymeric coating composition, as by preparing the latter from a monomer mixture which includes at least one polymerizable compound containing the hydroxybenzophenone derivative moiety.

Of particular value in many applications are latent absorbers of ultraviolet radiation. These are compounds which are converted to hydroxybenzophenones or their derivatives by contact with such radiation. They include resorcinol monobenzoates and their derivatives, which undergo a Fries rearrangement to the corresponding hydroxybenzophenone derivatives.

Another problem frequently associated with the use of industrial resins is their susceptibility to damage by solvent action and abrasion. This is typically overcome by coating the surface of the resinous article with an abrasion-resistant coating, sometimes referred to hereinafter as a "hardcoat". Many of such hardcoats are polysiloxane resins containing colloidal silica; they are frequently designated hereinafter as "silicone hardcoats".

When silicone or other hardcoats are used, it is frequently necessary to first apply to the resinous article a primar coating which increases adhesion of the hardcoat to the article. Since the abrasion-resistant ingredients of the hardcoat are usually not themselves absorbers of ultraviolet degradation, a suitable absorber must also be incorporated either in the hardcoat or the primer. This, unfortunately, may cause still other problems. Among these are decreased adhesion of the hardcoat even when a primer is used, loss of abrasion resistance in the hardcoat, cracking of the hardcoat, and the presence of a pink color in the hardcoat after curing. It is believed that some of these problems arise from the presence of the screening agent in the hardcoat, either originally or as the result of diffusion from the primer. The pink color is most often observed when the screening agent is originally present in the hardcoat.

A principal object of the present invention, therefore, is to provide novel monomeric and polymeric compositions of matter useful as latent absorbers of ultraviolet radiation.

A further object is to provide improved resinous articles characterized by resistance to ultraviolet degradation and also, when appropriate, to abrasion.

A further object is to provide resinous articles with an abrasion-resistant hardcoat whose adhesion is promoted by a polymeric primer containing a novel ultraviolet screening agent as an integral part thereof.

A still further object is to provide improved polycarbonate articles containing silicone hardcoats characterized by excellent adhesion and resistance to discoloration and ultraviolet degradation.

A still further object is to provide polycarbonate articles containing an improved acrylic coating, adapted to inhibit discoloration of the article and also, when appropriate, to serve as a primer coating between the article and a hardcoat layer.

Other objects will in part be obvious and will in part appear hereinafter.

The present invention is based on the discovery that certain novel polymerizable latent ultraviolet screening agents may be copolymerized with coating-producing monomers to form a polymeric coating composition which provides excellent resistance to ultraviolet degradation and, when used as a primer, excellent adhesion of hardcoats to the base resin.

In one of its aspects, the present invention includes polymerizable 3-aroyloxyphenyl carbamates having formula I in the drawings, wherein $A^1$ is an aromatic radical; each of $R^1$, $R^2$ and $R^3$ is independently hydrogen or an alkyl radical containing up to 4 carbon atoms; and $R^4$ is hydrogen or a lower alkyl radical.

The $A^1$ value in formula I is an aromatic radical, normally containing about 6–20 and most often about 6–10 carbon atoms. It may be an aromatic hydrocarbon or substituted hydrocarbon radical, provided the substituents do not have a deleterious effect on the properties of the compound for the purposes of this invention. Illustrative substituents are halo, nitro, hydroxy, alkoxy, alkyl, carbalkoxy and cyano. Hydrocarbon radicals, and especially the phenyl radical, are preferred.

Each of $R^1$, $R^2$ and $R^3$ may be hydrogen or an alkyl radical containing up to 4 carbon atoms. The alkyl radicals are preferably primary and still more preferably methyl. Especially preferred are compounds in which each of $R^1$, $R^2$ and $R^3$ is hydrogen, and slightly less preferred are those in which $R^1$ is methyl and each of $R^2$ and $R^3$ is hydrogen. $R^4$ may be hydrogen or a lowr alkyl radical (i.e., an alkyl radical containing up to 7 carbon atoms); it is usually hydrogen or methyl and preferably methyl.

From the foregoing description, it will be apparent that the compounds of this invention include a wide variety of 3-aroyloxyphenyl carbamates. The especially preferred compound, however, is 3-benzoyloxyphenyl 2-methacryloxyethylcarbamate, in which $A^1$ is phenyl; each of $R^1$, $R^2$ and $R^3$ is hydrogen; and $R^4$ is methyl.

The 3-aroyloxyphenylcarbamates having formula I may be prepared by reacting a resorcinol monoester having formula II with an isocyanatoalkyl acrylate having formula III, wherein $A^1$, $R^1$, $R^2$, $R^3$ and $R^4$ are as previously defined. The isocyanatoalkyl acrylates (particularly isocyanatoethyl methacrylate) are a known class of compounds and are disclosed, for example, in U.S. Pat. Nos. 2,718,516 and 4,278,809.

The reaction is typically effected by preparing a mixture of the isocyanatoalkyl acrylate and resorcinol monoester, typically in a mole ratio of about 0.85–1.15:1 and preferably about 1–1.1:1, which further contains a minor proportion (usually about 0.5–5.0% by weight) of a catalyst, and heating the same at a temperature of about 50°–125° C. until reaction is complete. It is normally conducted in a solvent such as methylene chloride, chloroform, petroleum naphtha, toluene, dimethylformamide or the like. Suitable catalysts include tertiary amines such as triethylamine, benzyldimethylamine and 1,4-diazabicyclo[2.2.2]octane; tertiary phosphines such as triethylphosphine; tetraalkyl titanates such as tetraisopropyl titanate and tetrabutyl titanate; organotin compounds such as dibutyltin dilaurate; transition metal chelates such as ferric acetylacetonate, manganese(III)acetylacetonate and vanadium(III)acetylacetonate; and mixtures thereof. The 3-aroyloxyphenyl carbamate product may be isolated by conventional means including such steps as solvent evaporation and recrystallization.

The preparation of the 3-aroyloxyphenyl carbamates of this invention is illustrated by the following example.

EXAMPLE 1

A mixture of 65 grams (0.30 mol) of resorcinol monobenzoate, 50 grams (0.32 mol) of isocyanatoethyl methacrylate, 1.05 grams of dibutyltin dilaurate and 400 ml. of chloroform was heated under reflux for 4 hours. The solvent was then removed by vacuum stripping and the residue was recrystallized from a mixture of ethyl acetate and hexane. There was obtained 100.5 grams (87% of theoretical) of the desired 3-benzoyloxyphenyl 2-methacryloxyethylcarbamate having a melting point of 57.5°–61.5° C.

The 3-aroyloxyphenyl carbamates of this invention may be polymerized under free radical conditions, either alone or in the presence of other monomers, to form polymers which are also within the scope of the invention. The term "polymer," as used herein, includes addition homopolymers and copolymers with one or more other monomers.

A large variety of polymerizable compounds can be used to form copolymers with the 3-aroyloxyphenyl carbamates of this invention. They include the following:

1. Unsaturated alcohols and esters thereof: Allyl, methallyl, crotyl, 1-chloroallyl, 2-chloroallyl, cinnamyl, vinyl, methylvinyl, 1-phenallyl and butenyl alcohols, and esters of such alcohols with saturated acids such as acetic, propionic, butyric, valeric, caproic and stearic; with unsaturated acids such as acrylic, α-substituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g., benzoic, phenylacetic, phthalic, terephthalic and benzoylphthalic acids.

2. Unsaturated acids (examples of which appear above) and esters thereof with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.

3. Unsaturated lower polyhydric alcohols, e.g., butenediol, and esters thereof with saturated and unsaturated aliphatic and aromatic, monobasic and polybasic acids, examples of which appear above.

4. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

5. Vinyl cyclic compounds including styrene, o-, m-, p-chlorostyrenes, bromostyrenes, fluorostyrenes and methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrrolidone and N-vinyloxazolidone.

6. Unsaturated ethers such as methyl vinyl ether, ethyl vinyl ether, cyclohexyl vinyl ether, octyl vinyl ether, diallyl ether, ethyl methallyl ether and allyl ethyl ether.

7. Unsaturated ketones, e.g., methyl vinyl ketone and ethyl vinyl ketone.

8. Unsaturated amides, such as acrylamide, methacrylamide, N-methylacrylamide, N-phenylacrylamide, N-allylacrylamide, N-methylolacrylamide, N-allylcaprolactam, diacetone acrylamide, hydroxymethylated diacetone acrylamide and 2-acrylamido-2-methylpropanesulfonic acid.

9. Unsaturated aliphatic hydrocarbons, for instance, ethylene, propylene, butenes, butadiene, isoprene, 2-chlorobutadiene and α-olefins in general.

10. Unsaturated alkyl halides, e.g., vinyl fluoride, vinyl chloride, vinyl bromide, vinylidene chloride, vinylidene bromide, allyl chloride and allyl bromide.

11. Unsaturated acid anhydrides, e.g., maleic, citraconic, itaconic, cis-4-cyclohexene-1,2-dicarboxylic and bicyclo(2.2.1)-5-heptene-2,3-dicarboxylic anhydrides.

12. Unsaturated acid halides such as cinnamyl, acrylyl, methacrylyl, crotonyl, oleyl and fumaryl chlorides or bromides.

13. Unsaturated nitriles, e.g., acrylonitrile, methacrylonitrile and other substituted acrylonitriles.

The preferred polymers of this invention are copolymers which contain structural units derived from the compound of formula I in combination with at least one acrylic monomer. The term "acrylic monomer" as used herein includes acrylic and methacrylic acids and their derivatives, chiefly esters and amides, but excludes the 3-aroyloxyphenyl carbamates of this invention. Acrylamide, methacrylate, ethyl acrylate, methyl methacrylate and ethyl methacrylate are illustrative, and of these the esters (especially of alkanols containing 1–4 carbon atoms) are preferred; the methacrylate esters are most preferred because their polymers exhibit particularly high weather resistance when used as coatings.

As previously indicated, the polymers of this invention are useful for the formation of coatings on resinous articles, said coatings serving as absorbers of ultraviolet radiation and also, when appropriate, as primers for hardcoats. When used as primers, they improve adhesion of the hardcoat to the resinous article and also inhibit discoloration.

Since the polymers of this invention are latent stabilizers, a factor in their utility is conversion, at least in part, of the 3-aroyloxyphenyl moiety by ultraviolet radiation to a corresponding 3-hydroxy-4-aroylphenyl moiety via a Fries rearrangement. Accordingly, another aspect of the invention is solid articles of manufacture comprising:

(A) a resin base, and (B) a surface coating on at least a part, and usually all, of said resin base, said surface coating comprising an addition polymer containing structural units of formula IV, wherein Z is at least one moiety selected from the group consisting of those having formulas V and VI and $A^1$, $R^1$, $R^2$, $R^3$ and $R^4$ are as previously defined.

The articles of manufacture of the present invention may be formed in conventional manners such as injection molding, extrusion, casting, cold forming, vacuum forming, blow molding, compression molding or transfer molding. They include both finished articles and stock material, the latter being exemplified by sheets and films. Transparent articles are preferred and are most often provided in sheet form.

Component A, the resin base, can comprise any suitable industrial resin. Illustrative resins are the aromatic polycarbonates, polyphenylene oxides, acrylics, thermoplastic polyesters, polyamides, polyimides, acrylonitrile-styrene copolymers, acrylonitrile-butadiene-styrene terpolymers, polyethylene and polyvinyl chloride. The invention is particularly applicable to polycarbonates and frequent reference will be made to them hereinafter. However, it should be understood that other suitable industrial resins may be substituted for polycarbonates when appropriate.

The polycarbonates are well known in the art; they are ordinarily prepared by reacting a polyhydroxyaromatic compound with a carbonate precursor such as phosgene, a haloformate or a carbonate ester. A dihydroxyaromatic compound may be used, whereupon a linear polymer containing units of formula VII, wherein $A^2$ is an aromatic radical derived from the dihydroxyaromatic compound, is obtained. Alternatively, a combination of dihydroxyaromatic and trihydroxyaromatic or other polyfunctional compounds may be used whereupon the resin may be branched or crosslinked.

Most often, the polycarbonate is prepared exclusively from one or more dihydroxyaromatic compounds. Suitable compounds of this type which may be used for the preparation of polycarbonates are disclosed in a large number of U.S. patents including the following, the disclosures of which are incorporated by reference herein:

| | |
|---|---|
| 3,161,615 | 3,666,614 |
| 3,220,973 | 3,875,256 |
| 3,312,659 | 3,989,672 |
| 3,312,660 | 4,377,662. |
| 3,313,777 | |

From the standpoint of the present invention, the preferred polycarbonates are those prepared from 2,2-bis(4-hydroxyphenyl)propane, referred to hereinafter as "bisphenol A".

Other examples of suitable base resins are the polyester-polycarbonates of the type obtained by the reaction of at least one polyhydroxyaromatic compound with a mixture of phosgene and a dicarboxylic acid chloride such as isophthaloyl chloride. Such polyester-polycarbonates are also known in the art and are disclosed in a number of patents and publications.

The molecular weight of the base resin is not critical, and those skilled in the art will easily be able to determine suitable molecular weight ranges. In the case of polycarbonates, for example, satisfactory molecular weights are generally represented by intrinsic viscosities within the range of about 0.3–1.0, preferably about 0.4–0.65, as measured in methylene chloride at 25° C.

Component B, the surface coating, is an addition polymer of this invention and preferably a copolymer with at least one acrylic monomer as described hereinabove. The preparation and use of various polymers of this general type as coatings is disclosed hereinabove and in a number of U.S. patents, including the following:

| | |
|---|---|
| 3,313,866 | 4,310,650 |
| 4,239,798 | 4,410,594. |
| 4,278,804 | |

The disclosures of these patents are incorporated by reference herein.

Other structural units may also be present in component B, typically in amounts up to about 25% by weight based on the acrylic monomer-derived units. Examples are units derived from ethylenically unsaturated silane monomers, including such materials as vinylsilanes and γ-methacryloxypropyltrimethoxysilane, and polyfunctional acrylates as described hereinafter when the coating is produced by polymerization of a deposited monomer layer.

The composition from which the coating is deposited is typically a solution in a substantially inert organic liquid of an addition copolymer prepared by polymerizing a mixture containing about 5–50% by weight of the 3-aroyloxyphenylcarbamates of formula I, with the balance being at least one acrylic monomer or a combination thereof with any other monomers present. Organic liquids which may be employed include alcohols, ethers, esters and the like; examples thereof are ethylene glycol, ethylene glycol monomethyl ether, ethylene glycol dimethyl ether, ethylene glycol monobutyl ether, diethylene glycol and ethers thereof, butyl acetate, ethylene glycol diacetate, and mixtures of the foregoing. Copolymer emulsions or suspensions may also be used. The total monomer concentration in the solution, emulsion, suspension or the like is typically about 5–50% by weight.

Polymerization is usually initiated by the action of one or more free radical polymerization initiators such as benzoyl peroxide, tertiary butyl hydroperoxide, acetyl peroxide, hydrogen peroxide, azobisisobutyronitrile, persulfate-bisulfate, persulfate-sodium formaldehyde sulfoxylate, chlorate-sulfite and the like. Polymerization by techniques such as ultraviolet, electron beam or plasma irradiation is also contemplated. Chain transfer agents, typically mercaptans such as butanethiol or dodecanethiol, may be present in the solution. Polymerization most often precedes deposition of the coating on the base resin, but deposition followed by polymerization is also possible. In the latter case, crosslinking monomers such as polyfunctional acrylates may be present in minor amounts, typically up to about 5% by weight of the monomer mixture. The coating composition may additionally contain such materials as antioxidants, flow control agents, quenchers, dyes, pigments, surfactants, flatting agents and the like.

The molecular weights of the polymers used as component B are, in general, the same as those of comparable polymeric coating materials known in the art. The number average molecular weight, as determined by gel permeation chromatography, is most often above about 10,000 and is usually about 15,000–50,000.

The preparation of coating compositions useful as component B in the articles of this invention is illustrated by the following examples. All parts, percentages and other proportions in the examples herein are by weight unless otherwise indicated.

EXAMPLES 2–4

Solutions of 50 grams of a mixture of acrylic monomer and 3-benzoyloxyphenyl 2-methacryloyloxyethylcarbamate, 0.25 gram of azobisisobutyronitrile and 0.15 gram of dodecanethiol in 200 ml. of toluene were heated at 80° C. under nitrogen for 18 hours, with stirring. An additional 0.125 gram of azobisisobutyronitrile was then added and heating was continued for four hours. The solutions were poured into hexane, the precipitated amorphous copolymers (having number average molecular weights of about 20,000) were removed by filtration and dissolved in a solvent mixture consisting of 80% ethylene glycol monobutyl ether and 20% ethylene glycol diacetate. The constitutions of the compositions thus obtained are listed in Table I.

TABLE I

| Example | Polymer concentration, % | Acrylic monomer | |
|---|---|---|---|
| | | Percent of monomer mixture | Identity |
| 2 | 30 | 70 | Methyl methacrylate |
| 3 | 25 | 52 | Methyl methacrylate |
| 4 | 12 | 80 | Ethyl methacrylate |

In the production of the articles of this invention, the coating is formed on the base resin article by methods which may include conventional coating operations such as flowing, spraying, dipping, brushing, roller coating, spin coating, drawing down or the like followed by removal of any solvent or other inert liquid by evaporation and then by drying, typically at a temperature within the range of about 20°–150° C. and preferably 50°–150° C. The thickness of the primer coating thus applied is typically substantially uniform and is about 0.002–1.0 mil, most often about 0.01–0.1 and preferably about 0.02–0.08 mil.

Another embodiment of the invention is coated articles as described hereinabove which further comprise (C) an abrasion-resistant coating adhered to component B. The abrasion-resistant surface coating, or hardcoat, is often adhered to the entire coated surface of the article. It is within the scope of the invention, however, for the hardcoat to be adhered to only a portion of the article's surface, as, for example, to only one surface of a transparent sheet.

A variety of hardcoats may be used as component C; included are silicone hardcoats, various organic coatings, glass coatings, metal oxide coatings and evaporative or "sputtered" coatings. Silicone hardcoats are preferred, and reference to them will frequently be made hereinafter; however, it should by understood that other types of hardcoats may be substituted for silicone hardcoats when appropriate.

Typical coating compositions for producing silicone hardcoats comprise aqueous solutions of partial condensates of silanols of the formula $R^5Si(OH)_3$, wherein $R^5$ is an alkyl radical containing 1–3 carbon atoms or an aryl radical. Colloidal silica is usually also present in dispersion. Typically, such compositions are prepared by adding an aqueous dispersion of colloidal silica to an alkyl- or aryltrialkoxysilane which contains a small proportion of an acetoxy reagent such as acetic acid or an alkyltriacetoxysilane. A two-phase system is initially formed; upon standing for about 6–8 hours at a temperature in the range of about 20°–40° C., a single phase forms. During this time and upon further hydrolysis, typically for a period of about 24–48 hours depending on the desired final viscosity, the trialkoxysilane is hydrolyzed and partially condensed to form siloxanols. The degree of condensation and the viscosity of the coating composition vary with time and with the pH of the original composition, which, for maximum shelf life, should be maintained within the range of about 3–8 with the exact value dependent to some degree on the chemical nature of the composition.

The coating composition may optionally contain other ingredients. For example, polysiloxane polyether copolymers are effective as flow control agents, and functionally terminated oligosiloxanes wherein the end groups are hydroxy, alkoxy or amino react with the siloxanols upon curing improve the crack resistance of the hardcoat. Also contemplated are ultraviolet screening agents known in the art, which typically contain functional groups of the type disclosed hereinafter.

Silicone hardcoat-forming compositions as described hereinabove are known in the art and are disclosed, for example, in the aforementioned U.S. Pat. Nos. 4,239,798; 4,278,804; and 4,410,594, as well as in the following, the disclosures of which are also incorporated by reference herein:

3,986,997
4,368,235
4,368,236.

Other art-recognized variations of said coating compositions may be employed in the present invention.

The hardcoat is applied to the article coated with component B, ordinarily by one of the coating operations previously recited, and is subsequently cured by heating at a temperature within the range of about 75°–150° C., optionally in the presence of a condensation catalyst. The thickness of the hardcoat is usually about 0.1–0.7 mil, preferably about 0.2–0.3 mil. The product of these operations is an article whose appearance and color are substantially those of the base resin and which is protected from ultraviolet degradation and discoloration and from damage by abrasion, solvent action and the like.

The preparation and testing of articles of this invention is illustrated by the following examples.

EXAMPLE 5

A coating composition prepared according to Example 2 was drawn down on a bisphenol A polycarbonate panel to form a 2-mil coating. The panel was dried at room temperature and in a vacuum oven at 60° C. It was then placed on a rotating table 10 inches below a bank of sunlamps and exposed for 1000 hours. The yellowness index was measured by ASTM procedure D1925, compared with an uncoated bisphenol A polycarbonate control panel. Under these conditions, the yellowness index of the coated panel was 4.5 while that of the control was 13.2.

EXAMPLE 6

A coating composition prepared according to Example 4 was flow-coated on a bisphenol A polycarbonate panel, drained for 15 minutes and dried at 130° C. for 15 minutes. The primed panel was then flow-coated with a commercial silicone hardcoat coating composition consisting of a suspension in 2-methyl-1-propanol of 2 parts of methyltrimethoxysilane and 1 part of an aqueous colloidal silica suspension, in an amount to provide 20% solids after standing for several hours, to which had been added 10–15% (based on solids content) of a silanated derivative of 2,4-dihydroxybenzophenone of the type disclosed in the aforementioned U.S. Pat. No. 4,278,804.

The coated panel was drained for 30 minutes and cured at 130° C. for 90 minutes. It was then subjected to consecutive 8-hour cycles of exposure to fluorescent ultraviolet light at 70° C. and 4-hour cycles of high humidity at 50° C. The adhesion of the hardcoat was tested by scribing with a crosshatch cutter, applying pressure-sensitive tape to the crosshatched area and rapidly removing the tape. Primer thickness was determined by etching away the primer with sulfuric acid and tracing across the etched area with a thickness-measuring instrument.

The results are given in Table II. The control was similarly prepared using as the primer an ethyl methacrylate homopolymer solution. Adhesion ratings are given in hours to failure; i.e., to the point when hardcoat was removed upon removal of the pressure-sensitive tape.

TABLE II

| Identity | Primer thickness, mils | Failure time, hrs. |
|---|---|---|
| Ex. 4 | 0.06 | >2930 |
| Control | 0.04 | 640 |

What is claimed is:

1. A polymerizable 3-aroyloxyphenyl carbamate having formula I in the drawings, wherein $A^1$ is an aromatic radical; each of $R^1$, $R^2$ and $R^3$ is independently hydrogen or an alkyl radical containing up to 4 carbon atoms; and $R^4$ is hydrogen or a lower alkyl radical.

2. A compound according to claim 1 wherein each of $R^1$, $R^2$ and $R^3$ is hydrogen and $R^4$ is hydrogen or methyl.

3. A compound according to claim 2 wherein $A^1$ is phenyl.

4. A compound according to claim 3 wherein $R^4$ is methyl.

5. A method for preparing a compound according to claim 1 which comprises reacting a resorcinol monoester having formula II with an isocyanatoalkyl acrylate having formula III, in the presence of a minor proportion of a catalyst.

6. A method according to claim 5 wherein the catalyst is at least one compound selected from the group consisting of tertiary amines, tertiary phosphines, tetraalkyl titanates, organotin compounds and transition metal chelates.

7. A method according to claim 6 wherein $A^1$ is phenyl, each of $R^1$, $R^2$ and $R^3$ is hydrogen and $R^4$ is methyl.

8. An addition polymer of a compound according to claim 1.

9. A polymer according to claim 8 which is a copolymer which also contains structural units derived from at least one acrylic polymer.

10. A polymer according to claim 9 which contains about 5–50% by weight of structural units derived from the compound of formula I.

11. A polymer according to claim 10 wherein the acrylic monomer is an ester of an alkanol containing 1–4 carbon atoms.

12. A polymer according to claim 11 wherein the acrylic monomer is methyl methacrylate or ethyl methacrylate.

13. A polymer according to claim 12 wherein $A^1$ is phenyl, each of $R^1$, $R^2$ and $R^3$ is hydrogen and $R^4$ is methyl.

14. A solid article of manufacture comprising:
(A) a resin base, and
(B) a surface coating on at least a part of said resin base, said surface coating comprising an addition polymer containing structural units of formula IV, wherein Z is at least one moiety selected from the group consisting of those having formulas V and VI; $A^1$ is an aromatic radical; each of $R^1$, $R^2$ and $R^3$ is independently hydrogen or an alkyl radical containing up to 4 carbon atoms; and $R^4$ is hydrogen or a lower alkyl radical.

15. An article according to claim 14 wherein component A is an aromatic polycarbonate resin and component B contains about 5–50% by weight of structural units of formula IV with the balance being derived from at least one acrylic monomer.

16. An article according to claim 15 wherein component A is a bisphenol A polycarbonate and the acrylic monomer is methyl methacrylate or ethyl methacrylate.

17. An article according to claim 16 wherein $A^1$ is phenyl; each of $R^1$, $R^2$ and $R^3$ is hydrogen; and $R^4$ is methyl.

18. An article according to claim 10 which further comprises (C) an abrasion-resistant coating adhered to component B.

19. An article according to claim 16 wherein component C is a silicone hardcoat coating, component A is an aromatic polycarbonate resin and component B contains about 5–50% by weight of structural units of formula IV with the balance being derived from at least one acrylic monomer.

20. An article according to claim 19 wherein component A is a bisphenol A polycarbonate and the acrylic monomer is methyl methacrylate or ethyl methacrylate.

21. An article according to claim 20 wherein $A^1$ is phenyl; each of $R^1$, $R^2$ and $R^3$ is hydrogen; and $R^4$ is methyl.

* * * * *